F. LAIRD.
SEED PLANTER.
APPLICATION FILED MAY 19, 1917.
1,240,227.
Patented Sept. 18, 1917.
2 SHEETS—SHEET 1.
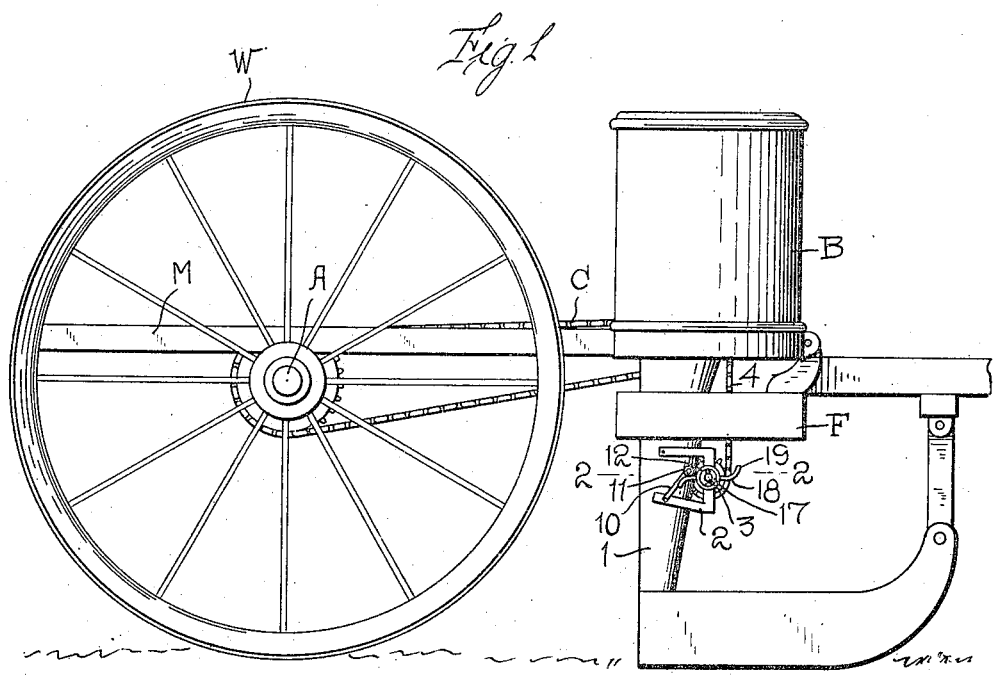
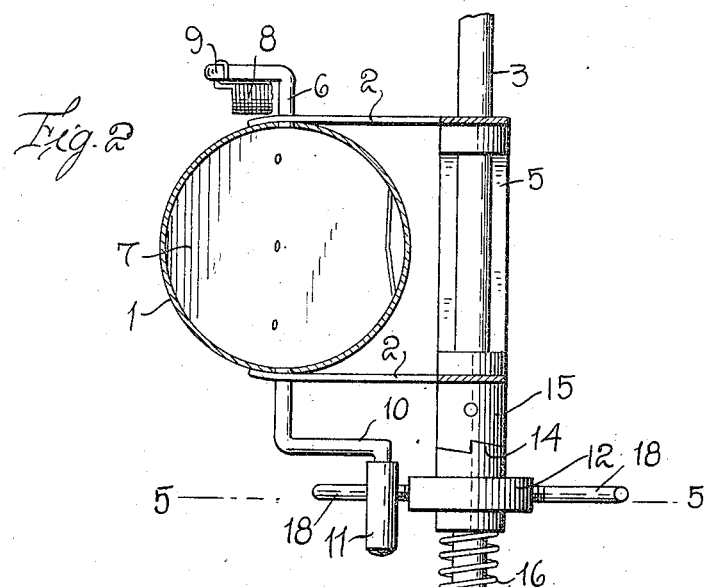
Inventor
F. LAIRD
By Watson E. Coleman
Attorney

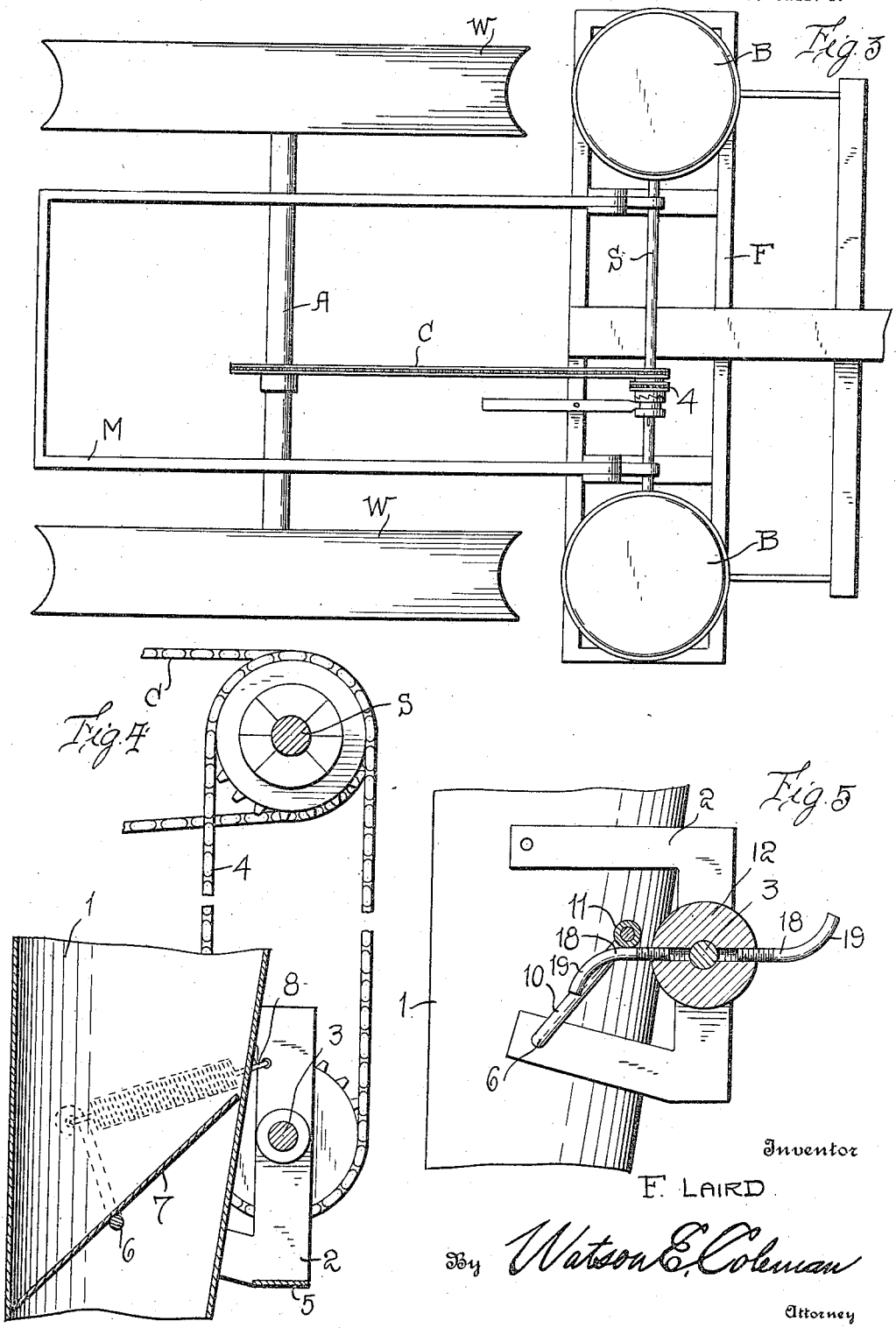

UNITED STATES PATENT OFFICE.

FREDERICK LAIRD, OF CLAYPOOL, OKLAHOMA, ASSIGNOR OF ONE-HALF TO JOSEPH T. PRINCE, OF CLAYPOOL, OKLAHOMA.

SEED-PLANTER.

1,240,227.

Specification of Letters Patent.

Patented Sept. 18, 1917.

Application filed May 19, 1917. Serial No. 169,736.

*To all whom it may concern:*

Be it known that I, FREDERICK LAIRD, citizen of the United States, residing at Claypool, in the county of Jefferson and State of Oklahoma, have invented certain new and useful Improvements in Seed-Planters, of which the following is a specification, reference being had to the accompanying drawings.

This invention relates to certain improvements in seed planters; and it is an object of the invention to provide a novel and improved attachment adapted to be employed in connection with a spout whereby the planter may be employed with ease and facility in connection with cotton seed.

The invention consists in the details of construction and in the combination and arragement of the several parts of my improved seed planter whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings; wherein—

Figure 1 is an elevational view, illustrating an attachment constructed in accordance with an embodiment of my invention, applied to the spout of a conventional type of corn planter;

Fig. 2 is an enlarged fragmentary sectional view, taken substantially on the line 2—2 of Fig. 1;

Fig. 3 is a view in top plan, of the device as disclosed in Fig. 1, and illustrating certain details of construction relative to the driving means for my improved attachment as herein set forth;

Fig. 4 is an enlarged fragmentary view, partly in vertical section and partly in elevation, illustrating certain features of my invention as herein included; and Fig. 5 is a sectional view, taken substantially on the line 5—5 of Fig. 2.

As disclosed in the accompanying drawings; M denotes the main frame of a conventional type of planter, and which is mounted upon an axle, A. Coacting with the axle A are the wheels W. The forward portion of the frame M is operatively engaged with a runner frame F, which supports in a conventional manner seed boxes or hoppers B. Rotatably supported by the frame F is a shaft S, herein disclosed as of a type adapted to coact with the usual type of drill plates coacting with the seed boxes of a corn planter. The shaft S is operatively engaged in a conventional manner with the axle A, and preferably through the medium of a sprocket chain C.

Coacting with and depending from each of the boxes B is a spout 1, to which my improved attachment is adapted to be applied. As herein embodied my improved attachment comprises brackets 2 adapted to be suitably engaged with the spout 1 at opposite sides thereof and which brackets serve as bearings for a shaft 3 operatively engaged with the shaft S through the medium of sprocket chain 4, or in any other manner which may be employed with convenience and facility. The outer portions of the brackets 2 at their lower ends are maintained in predetermined spaced relation through the medium of a connecting brace or member 5, preferably integrally formed therewith.

Rotatably supported by the brackets 2 and intersecting the spout 1 is a rock shaft 6. Fixed to the rock shaft 6 within the spout 1 is a valve or plate 7, which serves to control the passage of the cotton seeds through the spout 1. The valve or plate 7 is normally maintained in a closed position through the medium of a retractile member 8, herein disclosed as a conventional coil spring anchored at one end to an upstanding rock arm 9, arranged at one end of the rock shaft 6, and anchored at its opposite end to the upper portion of the adjacent bracket 2.

The opposite end portion of the shaft 6 is provided with a crank 10, having loosely mounted on the free end portion thereof a sleeve 11, serving as an antifriction member.

Loosely mounted on the shaft 3 is a disk 12, having its hub provided with a beveled clutch face 14, adapted to coact with a clutch member 15 fixed to the shaft 3, whereby it will be perceived that the disk 12 will be caused to rotate with the shaft 3 upon the forward movement of the machine. The clutch face 14 and member 15 are normally maintained in operative engagement through the medium of an expansible member 16, herein disclosed as a coil spring encircling the shaft 3 and interposed between the disk 12 and a stop member 17, arranged at the adjacent extremity of the shaft 3.

In threaded engagement with the periphery of the disk 12, and preferably at diametrically opposed points, are the fingers 18, having their outer end portions disposed on a predetermined curvature as indicated at 19. The curved portions 19 of the fingers 18 are adapted to engage the crank 10, or more particularly the sleeve 11 thereof, from below so that as the disk 12 rotates, the plate or valve 7 will be intermittently moved into open position to permit discharge of the cotton seeds. The plate or valve 7 serves to catch the seeds as they are discharged from out the adjacent box or hopper B so that the intermittent opening of the valve or plate 7 will cause the seeds to drop in hills or piles within a furrow so that a good stand is assured with the first planting.

It is also thought to be self-evident that upon reverse movement being imparted to the shaft 3, as in making a turn or in backing the machine, or from any other cause, the contact of the finger 18 with the crank 10 will hold the disk 12 against rotation, as the bevel of the clutch face 14 and the clutch member 15 is such as to permit the clutch member 15 to have a rearward rotation independently of the disk 12.

It is also preferred that when in closed position the plate or valve 7 be disposed downwardly on a predetermined incline, which arrangement is effected by having the plate or valve 7 substantially oval in form.

From the foregoing description, it is thought to be obvious that a seed planter constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

In combination with the spout of a seed box, a shaft rotatably supported thereby, a rock shaft disposed through the spout and having a portion exteriorly of the spout provided with a crank, a valve plate within the spout and fixed to the rock shaft, a disk operatively engaged with the first named shaft, and a longitudinally adjustable finger radiating from the disk and arranged for contact with the crank of the rock shaft.

In testimony whereof I hereunto affix my signature, in the presence of two witnesses.

FREDERICK LAIRD.

Witnesses:
 FLOYD LAIRD,
 W. L. T. HILTON.

Copies of this patent may be obtained for five cents each, by addressing the "Commissioner of Patents, Washington, D. C."